С10942622B2

United States Patent
Chen et al.

(10) Patent No.: US 10,942,622 B2
(45) Date of Patent: *Mar. 9, 2021

(54) SPLITTING AND MERGING FILES VIA A MOTION INPUT ON A GRAPHICAL USER INTERFACE

(71) Applicant: International Business Machines Corporation, Armonk, NY (US)

(72) Inventors: David S C Chen, Taipei (TW); Micky W T Chiang, Taipei (TW); Chao Y. Huang, Taipei (TW); Chia-Hsueh Lin, Taipei (TW); Der-Joung Wang, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/373,897

(22) Filed: Apr. 3, 2019

(65) Prior Publication Data
US 2019/0227698 A1    Jul. 25, 2019

Related U.S. Application Data

(63) Continuation of application No. 14/629,856, filed on Feb. 24, 2015, now Pat. No. 10,318,105.

(30) Foreign Application Priority Data

Feb. 27, 2014  (TW) ................................ 103106932

(51) Int. Cl.
G06F 3/0481    (2013.01)
G06F 3/0488    (2013.01)
G06F 16/16     (2019.01)

(52) U.S. Cl.
CPC ........ *G06F 3/04817* (2013.01); *G06F 3/0488* (2013.01); *G06F 16/168* (2019.01)

(58) Field of Classification Search
CPC ... G06F 3/04817; G06F 16/168; G06F 3/0488
(Continued)

(56) References Cited

U.S. PATENT DOCUMENTS 7,865,749 B2 *   1/2011   Sandon ..................... G06F 1/08
                                                    713/322
7,908,302 B1     3/2011   Nagaralu et al.
(Continued)

FOREIGN PATENT DOCUMENTS

| EP | 1462920 A2   | 9/2004  |
|----|--------------|---------|
| TW | 200947948 A  | 11/2009 |
| TW | 201243604 A  | 11/2012 |
| WO | 2004084523 A1| 9/2004  |

OTHER PUBLICATIONS

"Droid Splitter", Ishara Software Corporation, https://play.google.com/store/apps/details?id=ishara.software.co.droidsplitter&hl=en, Oct. 20, 2012, 2 pages.
(Continued)

*Primary Examiner* — Michael Pham
(74) *Attorney, Agent, or Firm* — Reza Sarbakhsh; Edell, Shapiro & Finnan, LLC (57) ABSTRACT

Disclosed are a method and a computer system for splitting and merging files via a motion input on a graphical user interface. The method comprises determining existence of a motion input; splitting the file into split multiple partial files based on pre-configurations; and generating multiple partial file icons representing the split multiple partial files on the graphical user interface. The multiple partial files may be subsequently merged together.

10 Claims, 6 Drawing Sheets

(58) Field of Classification Search
USPC .......................................................... 707/693
See application file for complete search history.

(56) References Cited

U.S. PATENT DOCUMENTS

| | | | |
|---|---|---|---|
| 8,686,962 | B2 | 4/2014 | Christie |
| 2006/0294125 | A1 | 12/2006 | Deaven |
| 2007/0067362 | A1* | 3/2007 | McArdle ............... G06F 16/113 |
| 2011/0126094 | A1 | 5/2011 | Horodezky et al. |
| 2011/0276657 | A1 | 11/2011 | LeBlanc et al. |
| 2012/0030566 | A1 | 2/2012 | Victor |
| 2012/0254330 | A1 | 10/2012 | You et al. |
| 2012/0296882 | A1 | 11/2012 | Lee |
| 2014/0040611 | A1 | 2/2014 | Tenenboym et al. |
| 2015/0095839 | A1 | 4/2015 | Hombert |
| 2015/0163326 | A1* | 6/2015 | Pan ......................... H04W 4/18 709/217 |
| 2015/0242430 | A1 | 8/2015 | Chen et al. |

OTHER PUBLICATIONS

Rehman, "File Splitter for Android: Split Any File Into Smaller-Sized Segments", http://www.addictivetips.com/mobile/file-splitter-for-android-split-any-file-into-smaller-sized-segments/, Sep. 30, 2011, 4 pages.

Davis, "Easy File Split and Join", https://play.google.com/store/apps/details?id=com.hunterdavis.easyfilesplitandjoin&hl=en, Aug. 3, 2011, 2 pages.

Neal, "How to Split & Join Small Parts of Files on Android", http://androidadvices.com/split-join-small-parts-files-android/, Oct. 18, 2011, 2 pages.

Chong Guan Kuang Ren, "How to achieve fragmentation compression with 7-ZIP", http://briian.com/6077/7-zip-2.html, Jan. 29, 2009, 5 pages.

List of IBM Patents or Patent Applications Treated as Related, filed Apr. 4, 2019.

* cited by examiner

SPLITTING AND MERGING FILES VIA A MOTION INPUT ON A GRAPHICAL USER INTERFACE

BACKGROUND

The present invention relates to providing mechanisms for splitting a file and merging files, and more particularly, to a method and computer system for splitting a file and merging files by detecting a motion input, such as a touchscreen input or a gesture input.

A variety of appliances, including mobile phones, personal computers, notebook computers, and tablets, are in use in daily life. Due to the wide use of networks, a lot of users use portable appliances to send files in the form of attachments carried by emails and store the files in Web storage. However, there is a limitation to the size of a file sent by email. The maximum size of a file which can be stored in a file system of Web storage is also subject to a limitation. The prior art that pertains to compressing a file and splitting a file into multiple partial files is very useful. Typically, the operation performed to compress a file and split a file requires pre-configurations regarding the largest file size, the number of partial files, file formats (e.g., .rar, .zip, .7z), and file naming conventions, for example.

However, the prior art does not provide a convenient operation method for compressing/splitting a file to be sent or stored into multiple split partial files before the file is sent or stored.

SUMMARY

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides a novel method for splitting a single file intuitively and merging multiple split files at a receiving end intuitively. Specifically, the present invention is characterized in that, in response to a unique and intuitive motion input, such as a touchscreen input or a gesture input, a splitting module is started to split a file to be sent or stored into multiple split partial files. Upon detection of the operation, the file to be sent or stored gets split into multiple split partial files on a touch-control graphical user interface (GUI) according to pre-configurations. Similarly, another unique and intuitive motion input, such as a touchscreen input or a gesture input, is effectuated, so as to start a merging module for merging multiple split partial files to create an original file. Upon detection of the operation, the multiple split partial files are merged to create an original file on a touch-control graphical user interface (GUI) according to pre-configurations.

According to an embodiment of the present invention, the present invention provides a method for splitting a file via a motion input on a graphical user interface. The method comprises the steps of:

determining that a motion input is present; and splitting the file into split multiple partial files according to pre-configurations, wherein multiple partial file icons indicative of the split multiple partial files, respectively, are created on the graphical user interface.

According to another embodiment of the present invention, the present invention provides a method for merging all split multiple partial files via a motion input on a graphical user interface, wherein the partial files each include a header, the header comprising a preceding partial file pointer and a next partial file pointer, the method comprising the steps of:

determining that a motion input is present; and merging all the split multiple partial files respectively indicated by the multiple partial file icons on the graphical user interface according to the preceding partial file pointer and the next partial file pointer in the header of each partial file, so as to create an original file.

According to yet another embodiment of the present invention, the present invention provides a computer system for splitting a file via a motion input on a graphical user interface, comprising:

a host, comprising:

a bus system;

a memory connected to the bus system, wherein the memory stores therein an instruction; and;

a processing unit connected to the bus system, wherein the processing unit executes the instruction to implement the method.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer readable medium of a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program code for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, or partly on the user's computer and partly on a remote computer.

The present invention is described below with reference to flowchart illustrations and/or block diagrams of computer apparatus, methods and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 2 through FIG. 5, the flowchart and block diagrams in the Figures illustrate the architecture, functionality, and operation of possible implementations of computer apparatus, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
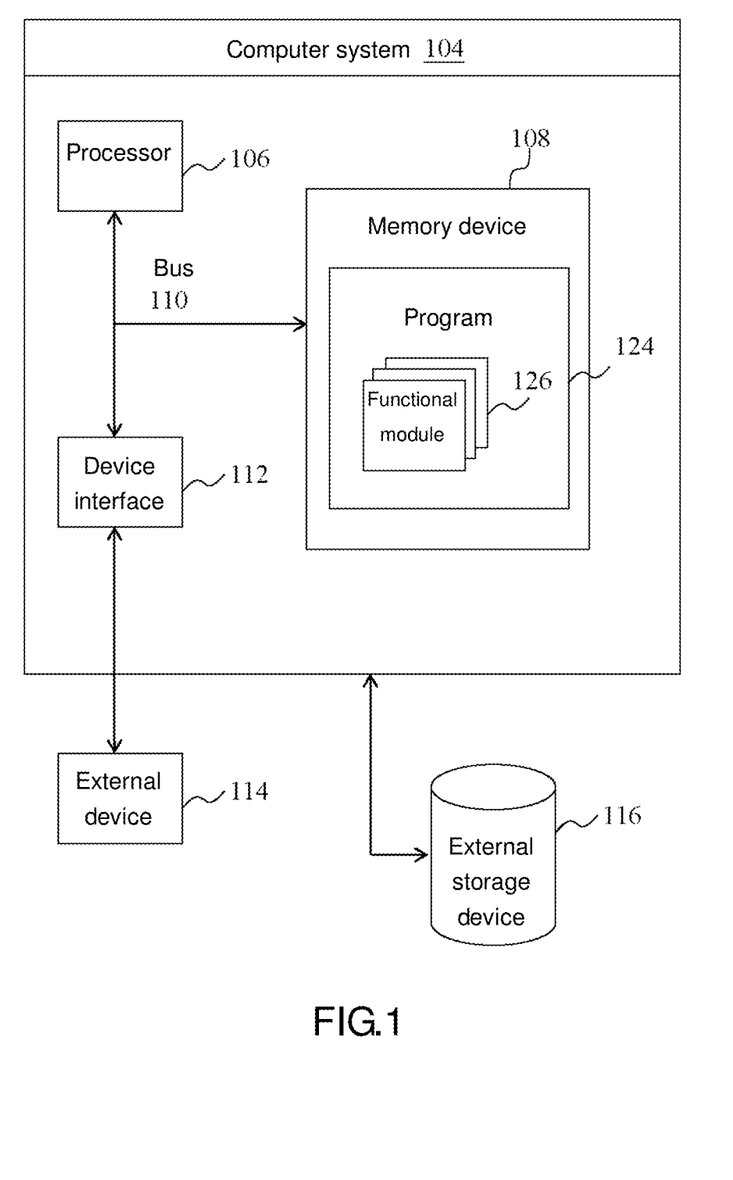
FIG. 1 is a schematic view of the hardware framework of a computer system according to an illustrative embodiment of the present invention.

FIG. 1 is a schematic view of the hardware framework of a computer system 104 according to an illustrative embodiment of the present invention. The computer system 104 comprises one or more processors or a processing unit 106, a memory device 108, a bus 110 for connecting different system components (including the processing unit 106 and the memory device 108), and a device interface 112.

The memory device 108 comprises a volatile memory, a random access memory (RAM), and/or a cache memory. The memory device 108 further comprises any other movable/immovable or volatile/nonvolatile storage medium, such as an immovable nonvolatile hard disk drive (not shown), a movable nonvolatile floppy disk drive, a CD-ROM, a DVD-ROM, an optical storage medium, a USB flash drive, or a memory card. Each drive connects to the bus 110 through one or more data medium interfaces.

The processor 106 accesses the program code, such as a program 124, in the memory device 108 or an external storage device 116. The program 124 has one or more functional modules 126, including but not limited to an operating system, for providing an application (to be described later and illustrated with FIG. 4 and FIG. 5) required for a function and/or method of the present invention, and any other program module and program data. Each, or a combination, of the functional modules 126 is implemented in a network environment. The application required for a function and/or method of the present invention comprises a splitting and/or merging module of the present invention. The splitting and/or merging module comprises a program module and an instruction for splitting a file to be sent or stored into multiple split partial files or merging multiple split partial files to create an original file. The functional module 126 is provided in the form of a single instruction or a plurality of instructions and disposed in different program code segments, different programs, and multiple said memory devices 108.

In fact, the functional modules 126 required for a function and/or method of the present invention are each provided in the form of a module in an application or a daemon. However, in another embodiment, it is practicable that the functional modules 126 are each provided in the form of any other programs. The functional modules 126 each comprise program codes described below and illustrated with FIG. 4 and FIG. 5.

The bus 110 comes in different bus structures, including memory bus, peripheral bus, Accelerated Graphics Port (AGP), and a processor or local bus of at least one of the following bus architectures, including but not limited to, Industrial Standard Architecture (ISA) bus, Micro Channel Architecture (MCA) bus, Enhanced ISA bus, Video Electronics Standards Association (VESA) bus, and Peripheral Component Interconnect (PCI) bus.

The bus 110 provides a communication link for components in the computer system 104. The computer system 104 communicates with and links to one or more external devices 114 (such as a keyboard, direction-indicating apparatus, or display unit) through the device interface 112. The external devices 114 are digital camera modules for inputting image data and barcode data, or are I/O devices which can be integrated into a display unit 210 to provide a touchscreen whereby users operate an application and compile data. Furthermore, the computer system 104 communicates with the external device 114, the external storage device 116, or the other computer devices/systems through a network interface (such as a network interface controller or a modem). In this regard, the network is provided in the form of a connection of any type, including a fixed connection based on a local area network (LAN) or a wide area network (WAN), or dial-up Internet access service provided by an Internet service provider (ISP). Furthermore, the network is not restricted to wired or wireless connections, such as through GSM-enabled or Wi-Fi-enabled wireless networks for communicating with a computer device/system. Moreover, understandably, any other hardware constituent elements (not shown) and software (not shown), for example, an additional computer system, a router, and a firewall, can be included in the network.

In another embodiment, considering its basic structure and elements, the computer system 104 can be provided in the form of a general-purpose computer device, such as a personal computer (a desktop computer or a notebook computer), a server, or an appliance (e.g., IBM WebSphere Datapower SOA Appliance.) (http://www.redbooks.ibm.com/abstracts/redp4366.html) or Tivoli ISS Appliances ("IBM," "WebSphere," and "Tivoli" are registered trademarks owned by International Business Machine in the United States and/or any other countries.) Furthermore, the computer system 104 can also be implemented as a mobile computation device, such as a smartphone, a tablet, or a personal digital assistant (PDA). A data input module of a smartphone can be integrated into a display screen of the smartphone to provide a touchscreen whereby a user creates data or enters an instruction As shown in the diagrams, hardware components in the computer system 104 are not intended to be all-inclusive; instead, they represent the most important components of the present invention. For instance, the computer system 104 further comprises a standby memory storage device, such as a magnetic cassette, DVD, Bernoulli cartridge, and the like. The above and other variations fall with the scope and spirit of the present invention.

The present invention is hereunder further illustrated with a splitting and/or merging module according to an embodiment of the present invention, but persons skilled in the art understand that the present invention is not restrictive of the splitting and/or merging module.

Figure 2A:
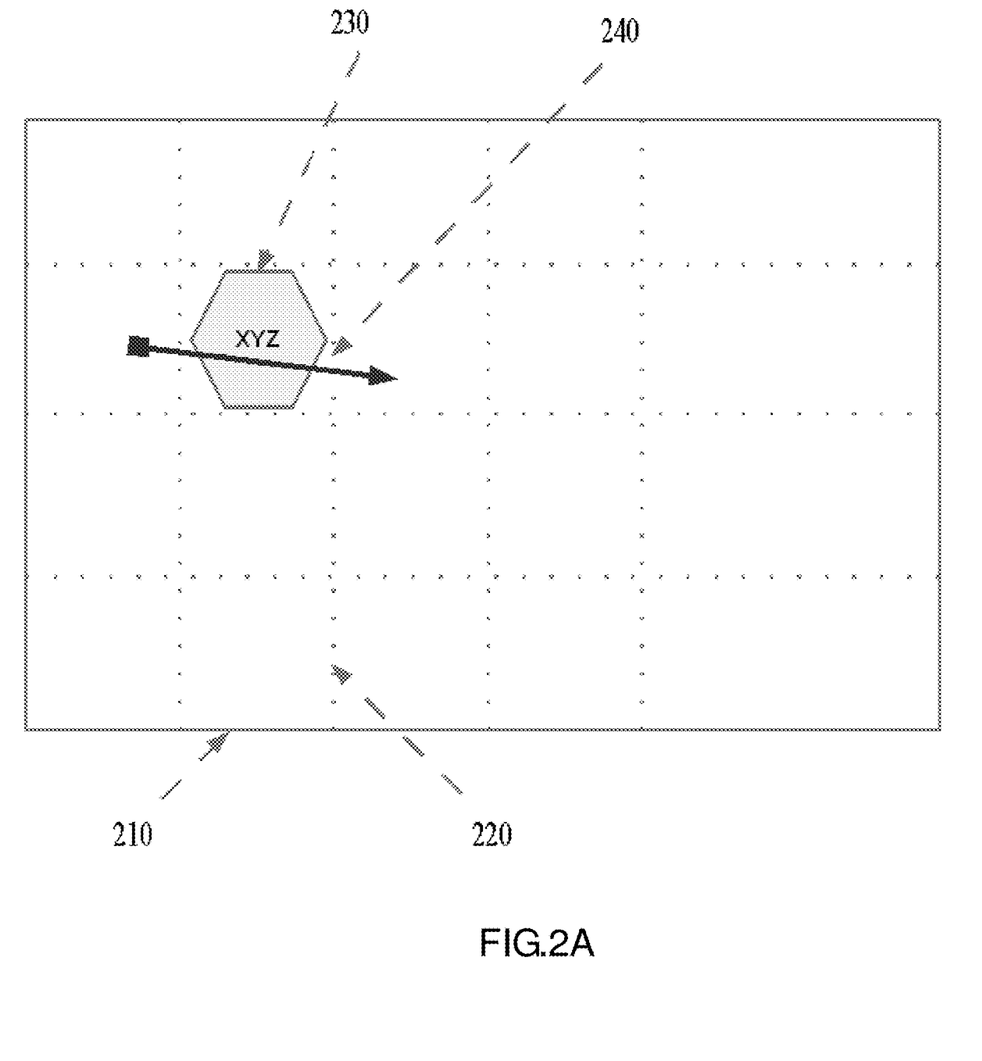
FIG. 2A and FIG. 2B are schematic views of splitting a file to be sent or stored into multiple split partial files on a touch-control graphical user interface (GUI) according to an embodiment of the present invention.
Figure 2B:
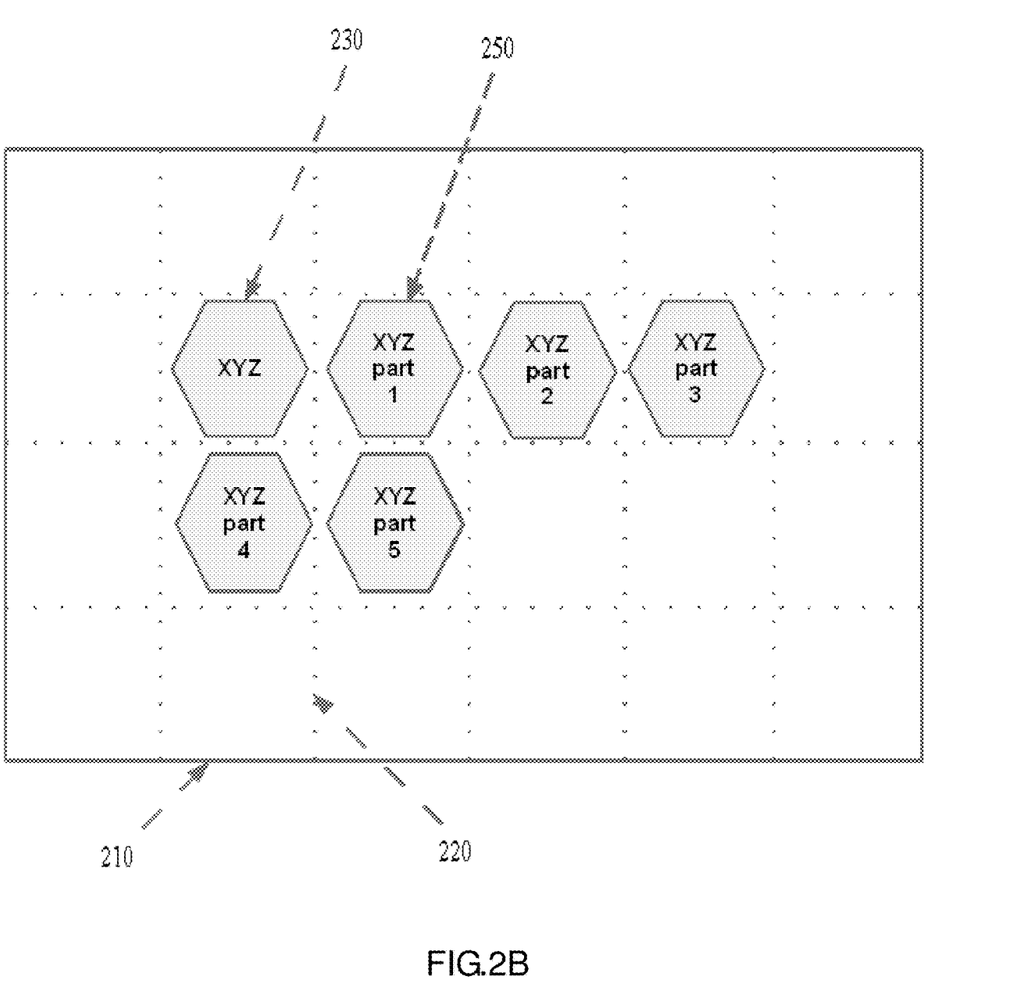

FIG. 2A and FIG. 2B are schematic views of splitting a file to be sent or stored into multiple split partial files on a touch-control graphical user interface (GUI) according to an embodiment of the present invention. Referring to FIG. 2A, the graphical user interface (GUI) comprises a desktop 210 and file icons 230. The desktop 210 comprises square icon borders 220 for partitioning off the desktop for containing the file icons 230.

Referring to FIG. 2A, to split a file XYZ indicated by the file icon 230 into files which are smaller and thus fit to be sent or stored, a user performs a unique and intuitive touch-control operation, for example, effectuating a touchscreen input 240 which entails the user's finger crossing at least two of the icon borders 220 surrounding the file icon 230, so as to start a splitting module for splitting the file XYZ, which is indicated by the file icon 230 and intended to be sent or stored, into multiple split partial files. Referring to FIG. 2B, upon detection that the user's finger has crossed at least two of the icon borders 220 surrounding the file icon 230, the file XYZ which is indicated by the file icon 230 and intended to be sent or stored gets split into multiple partial files according to pre-configurations (such as the largest file size, number of partial files, file format, and file naming conventions), and multiple partial file icons 250, that is, XYZ part 1 through XYZ part 6, indicative of the multiple split partial files, respectively, are created on the touch-control graphical user interface (GUI).

The present invention is not restricted to the touch-control operation based on the touchscreen input, but applies to any motion input, for example, recognizing a gesture input by conventional gesture recognition technology.

In fact, the graphical user interface (GUI) of the present invention is not restricted to touch-control. With a direction-indicating device, such as a mouse, a unique input is effectuated by performing a non-touch-control operation, for example, right-clicking and dragging with the mouse to cross the file icons 230, so as to implement the present invention.

Moreover, before sending or storing a file according to the prior art, it is necessary to compress the file in order to effectively reduce the size of the file, and then the compressed file received at the receiving end is decompressed as needed. Hence, according to an embodiment of the present invention, before being split, a file is compressed according to a pre-configured file format, such as .rar, .zip, or .7z. However, the present invention is not restrictive of the sequence of a split and a compression.

Figure 3:
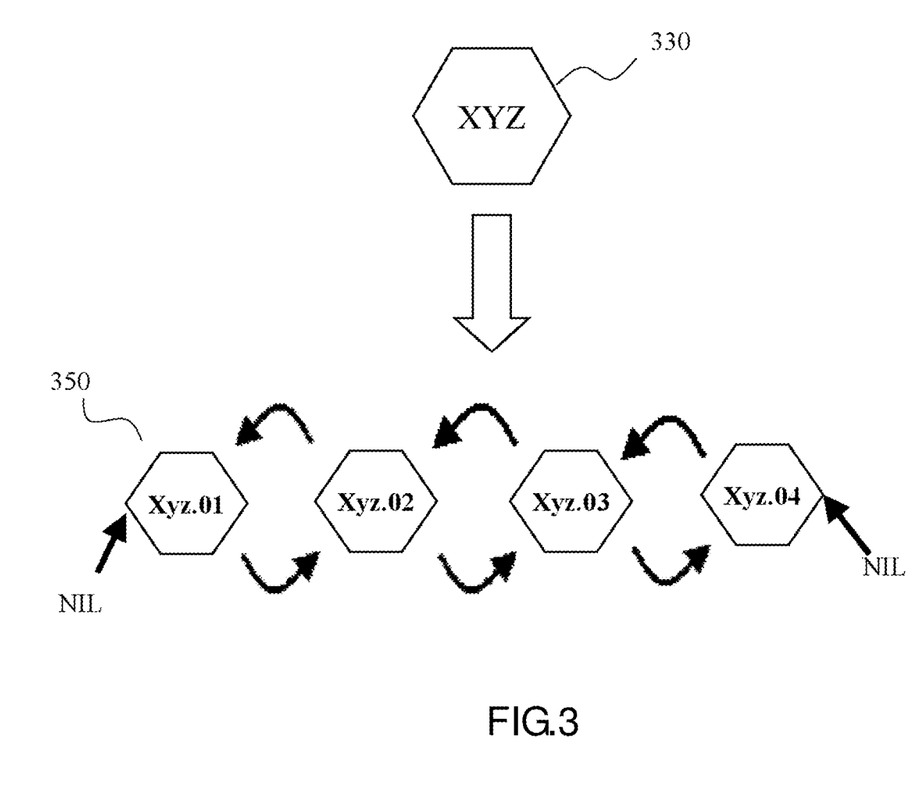
FIG. 3 is a schematic view of data regarding splitting a file to be sent or stored into multiple split partial files according to an embodiment of the present invention.

FIG. 3 is a schematic view of data regarding splitting a file to be sent or stored into multiple split partial files according to an embodiment of the present invention. The file XYZ, which is indicated by the file icons 330 and intended to be sent or stored, is split into multiple partial files indicated by partial file icons Xyz.01 through Xyz.04 350. The partial files each comprise a header. In addition to header data fields (such as filename, size, and CRC) required for conventional files, the headers of the partial files each comprise the preceding partial file pointer and the next partial file pointer for use in cross-reference and merging all the split partial files to create an original file.

Figure 4:
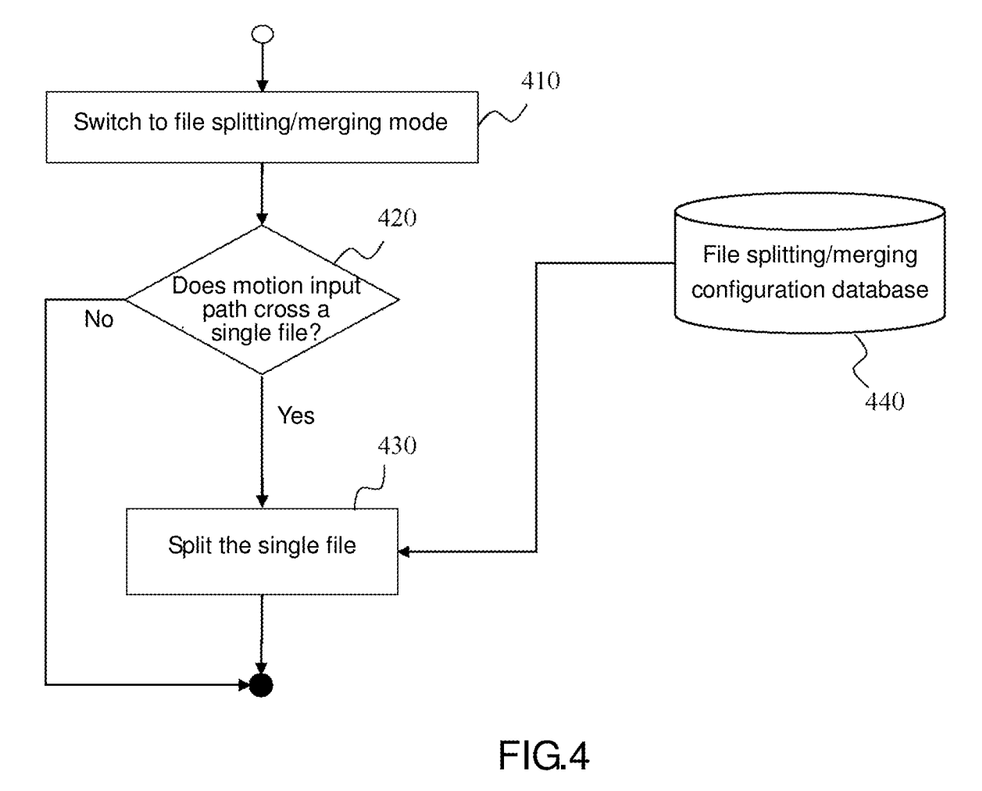
FIG. 4 is a flow chart of a method of splitting a file to be sent or stored into multiple split partial files according to an embodiment of the present invention.

FIG. 4 is a flow chart of a method of splitting a file to be sent or stored into multiple split partial files according to an embodiment of the present invention.

Step 410: a user's computer system 104 chooses to split/merge a file and switches the computer system 104 to a splitting/merging mode.

Step 420: the computer system 104 detects and determines whether a user's finger has crossed at least two of the icon borders 220 surrounding the file icon 230. As mentioned before, the present invention is not limited to the touch-control operation based on a touchscreen input, but applies to any motion input, for example, recognizing a gesture input by conventional gesture recognition technology.

Step 430: upon detection that the user's finger has crossed at least two of the icon borders 220 surrounding the file icon 230, the file XYZ which is indicated by the file icon 230 and intended to be sent or stored is split into multiple partial files according to pre-configurations (such as the largest file size, number of partial files, file format, and file naming conventions), and multiple partial file icons 250 indicative of the multiple split partial files, respectively, are created on the touch-control graphical user interface (GUI). As mentioned before, according to an embodiment of the present invention, before being split, a file is compressed according to a pre-configured file format, such as .rar, .zip, or .7z. The pre-configurations are configured in advanced and stored in a file splitting/merging configuration database 440. The pre-configurations include the largest file size, the number of partial files to be split, the file format, and the conventions for naming the partial files. In fact, the present invention is not restrictive of the sequence of a split and a compression.

Figure 5:
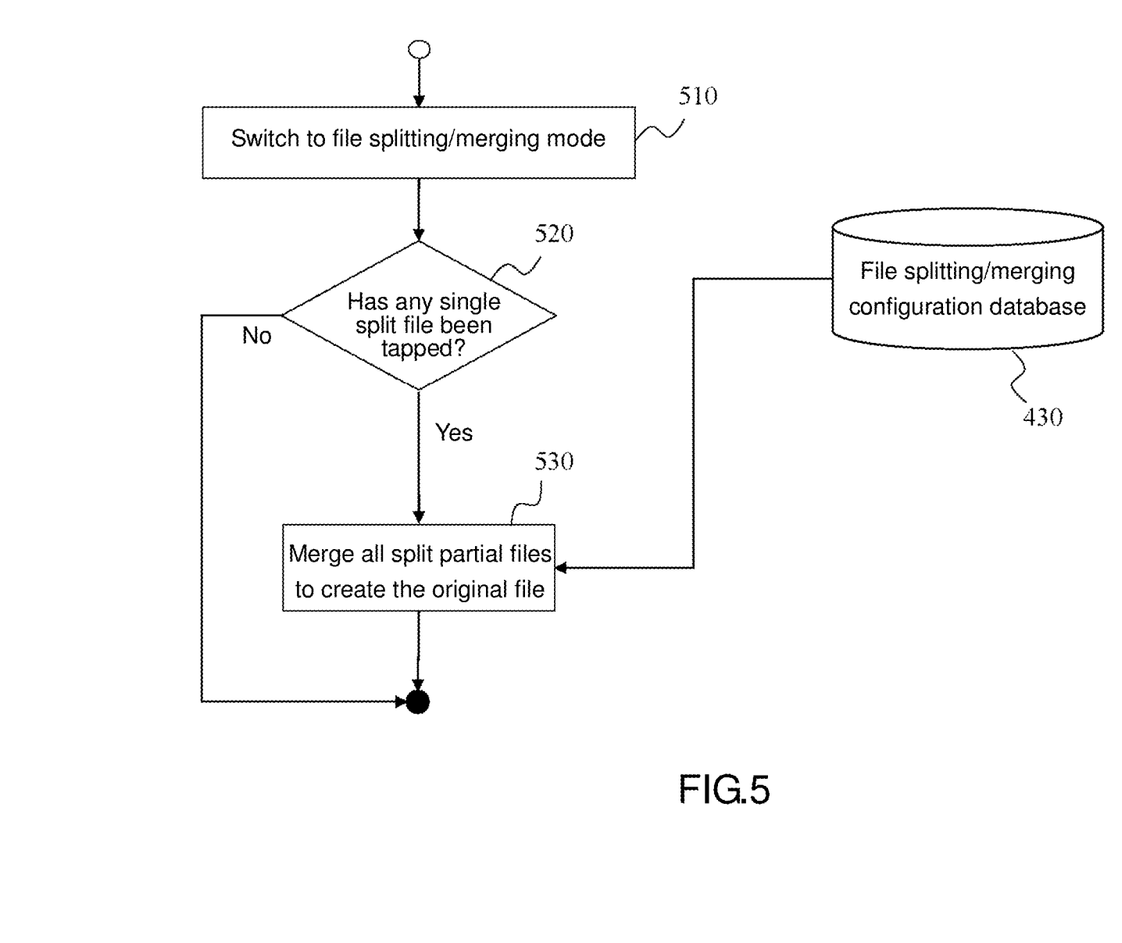
FIG. 5 is a flow chart of a method of merging multiple split partial files to create an original file according to an embodiment of the present invention.

FIG. 5 is a flow chart of a method of merging multiple split partial files to create an original file according to an embodiment of the present invention.

Step 510: the computer system 104 of the user chooses to split/merge a file and thus switch the computer system 104 to the splitting/merging mode.

Step 520: the computer system 104 detects and determines whether any single split partial file icon 250 has been tapped. As mentioned before, the present invention is not limited to a touch-control operation based on a touchscreen input, but applies to any motion input, for example, recognizing a gesture input by conventional gesture recognition technology.

Step 530: upon determination that a single split partial file icon 250 has been tapped, all the split partial files indicated by the partial file icons 250, respectively, are merged according to the preceding partial file pointers and the next partial file pointers in the headers, so as to create the original file. As mentioned before, according to an embodiment of the present invention, before being split, a file is compressed according to a pre-configured file format, such as .rar, .zip, or .7z. At this point in time, the split partial files indicated by the partial file icons 250, respectively, are merged so as to create the original file, and then a conventional decompression operation is performed on the original file according to a pre-configured file format.

The present invention applies to a wide variety of conventional appliances, such as mobile phones, personal computers, notebook computers, and tablets, which operate with or without a network and are equipped with non-touch control graphical user interfaces or touch control graphical user interfaces.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A computer program product for splitting a file via a motion input on a graphical user interface, the computer program product comprising one or more non-transitory computer readable storage media collectively having program instructions embodied therewith, the program instructions executable by at least one processor to cause the at least one processor to:
   determine that a first motion input is present;
   compress the file according to a file format;
   split the compressed file into multiple partial files according to pre-configurations, wherein the partial files each include a portion of the compressed file and are associated with an order to create the compressed file, and wherein each partial file includes a header comprising a plurality of pointers including a preceding partial file pointer pointing to a preceding partial file in the order and a next partial file pointer pointing to a succeeding partial file in the order to enable merging of the partial files to create the compressed file;
   create partial file icons indicative of each of the multiple partial files on the graphical user interface, wherein the partial file icons are indicative of respective partial files including initial, intermediate, and ending portions of the compressed file;
   determine that a second motion input is present for selecting a partial file icon indicative of a partial file containing an intermediate portion of the compressed file;
   merge the multiple partial files from the selected partial file by traversing the preceding partial file pointer and the next partial file pointer in the header of each partial file to create the compressed file; and
   decompress the created compressed file according to the file format to produce the file.

2. The computer program product of claim 1, wherein the first motion input comprises:
   crossing at least two icon borders surrounding a file icon indicative of the file on the graphical user interface.

3. The computer program product of claim 1, wherein the pre-configurations include a largest file size, a number of partial files to be split, the file format, and multiple partial files naming conventions.

4. The computer program product of claim 3, wherein the file format includes one of .rar, .zip, and .7z.

5. The computer program product of claim 1, wherein the first motion input comprises one of a touchscreen input and a gesture input.

6. A computer program product for merging multiple partial files via a motion input on a graphical user interface, the computer program product comprising one or more non-transitory computer readable storage media collectively having program instructions embodied therewith, the program instructions executable by at least one processor to cause the at least one processor to:

determine that a motion input is present for selecting a partial file icon on the graphical user interface to merge the multiple partial files, wherein the partial files each include a portion of an original file compressed according to a file format and are associated with an order to create the compressed original file, wherein the graphical user interface includes partial file icons indicative of respective partial files including initial, intermediate, and ending portions of the compressed original file, wherein the selected partial file icon is indicative of a partial file containing an intermediate portion of the compressed original file, and wherein each partial file includes a header comprising a plurality of pointers including a preceding partial file pointer pointing to a preceding partial file in the order and a next partial file pointer pointing to a succeeding partial file in the order to enable merging of the partial files to create the compressed original file;

merge the multiple partial files from the selected partial file by traversing the preceding partial file pointer and the next partial file pointer in the header of each partial file to create the compressed original file; and decompress the created compressed file according to the file format to produce the original file.

7. The computer program product of claim 6, wherein the motion input comprises:

tapping a partial file icon.

8. The computer program product of claim 6, wherein the compressed original file is split according to pre-configurations including a largest file size, a number of partial files to be split, the file format, and multiple partial files naming conventions.

9. The computer program product of claim 6, wherein the file format includes one of .rar, .zip, and .7z.

10. The computer program product of claim 6, wherein the motion input comprises one of a touchscreen input and a gesture input.

* * * * *